US010681218B2

(12) United States Patent
Warrick et al.

(10) Patent No.: US 10,681,218 B2
(45) Date of Patent: Jun. 9, 2020

(54) TELECOMMUNICATION METHOD AND SYSTEM FOR SIMPLIFYING COMMUNICATION SUCH AS CONFERENCE CALLS

(71) Applicant: CABANAWIRE INC., Calgary (CA)

(72) Inventors: Peter Warrick, Calgary (CA); Paul Cairns, Calgary (CA); Brian Fillo, Beaconsfield (CA)

( * ) Notice: Subject to any disclaimer, the term of this patent is extended or adjusted under 35 U.S.C. 154(b) by 0 days.

(21) Appl. No.: 16/198,821

(22) Filed: Nov. 22, 2018

(65) Prior Publication Data

US 2019/0116267 A1    Apr. 18, 2019

Related U.S. Application Data

(63) Continuation-in-part of application No. 15/594,570, filed on May 13, 2017.

(51) Int. Cl.
*H04M 3/56* (2006.01)
*H04M 3/42* (2006.01)

(52) U.S. Cl.
CPC ........... *H04M 3/562* (2013.01); *H04M 3/565* (2013.01); *H04M 3/42008* (2013.01); *H04M 2203/5063* (2013.01)

(58) Field of Classification Search
CPC .. H04M 3/562; H04M 3/565; H04M 3/42008; H04M 2203/5063; H04M 3/56; G06F 21/6254; H04L 12/1859; H04L 12/1818; H04L 65/403; H04L 65/1069
USPC ......................................................... 726/26
See application file for complete search history.

(56) References Cited

U.S. PATENT DOCUMENTS

| | | | |
|---|---|---|---|
| 8,238,536 B1 * | 8/2012 | Kavulak ................. | H04M 3/54 379/114.02 |
| 8,483,372 B2 | 7/2013 | Park | |
| 8,483,375 B2 * | 7/2013 | Dhara ................. | H04L 12/1818 370/260 |
| 8,503,654 B1 | 8/2013 | Ludwig | |
| 2004/0208303 A1 * | 10/2004 | Rajagopalan ........... | H04M 3/54 379/202.01 |
| 2008/0037744 A1 | 2/2008 | Fux | |
| 2011/0182415 A1 | 7/2011 | Jacobstein | |

(Continued)

OTHER PUBLICATIONS

TWILIO https://www.twilio.com/blog/May 2009/dialing-multiple-numbers-simultaneously-with-twilio.html.

*Primary Examiner* — Farid Homayounmehr
*Assistant Examiner* — Sanchit K Sarker
(74) *Attorney, Agent, or Firm* — Paul Sharpe; The Sharpe Group

(57) ABSTRACT

A method of simplifying electronic communications between a plurality of users by communication implementation and management. Each user has an electronic identifier, which may be of a type, such as a website address, domain, LinkedIn address, etc. Each identifier is unique to each user. The methods disclosed facilitate communication amalgamation between otherwise disparate electronic platforms. In one embodiment, different conference calling platforms may be amalgamated with simultaneous call out to users. In other embodiments, a conference calling platforms may be amalgamated with an electronic communication platform which is not a conference calling platform to render the latter effectively operational as the former in a unified manner.

14 Claims, 10 Drawing Sheets

(56) References Cited

U.S. PATENT DOCUMENTS

2012/0230485 A1    9/2012  Yap
2013/0218983 A1*   8/2013  Richard ................ H04W 12/02
                                                       709/206

* cited by examiner

TELECOMMUNICATION METHOD AND SYSTEM FOR SIMPLIFYING COMMUNICATION SUCH AS CONFERENCE CALLS

CROSS REFERENCE TO RELATED PATENTS AND APPLICATIONS

This application is a continuation in part of U.S. patent application Ser. No. 15/594,570, pending, filed May 13, 2017, claiming priority from U.S. provisional application 62/338,008, filed May 18, 2016.

FIELD OF THE INVENTION

The present invention relates to vastly improved telecommunication method for a plurality of users for one to one communication or in a conference environment where a number of users are required.

BACKGROUND OF THE INVENTION

There is a wide array of teleconferencing packages currently in use, many of which incorporate similar protocol. Typically, when one participant wishes to coordinate a conference call, also referred to as the host or moderator, the invitation is sent by email with instructions for call in details such as a telephone number and an access code. In many instances, there is a requirement for the invitee to respond with acceptance or declination. Assuming that all intended invitees respond, there are further limitations. The scheduled time may be altered by one or more of invitees. The result is that each invitee is re-contacted with the suggested new time and must then respond again by email, etc. with acceptance, declination or yet another suggested time. The contact process then repeats. Clearly, the greater the number of invitees, the higher the probability for repeated changes which can become burdensome and a colossal waste of valuable professional time.

These limitations are further exacerbated by the fact that the initial email notification is typically sent out to the invitees several days in advance of the scheduled time. After several days a typical professional can have accrued hundreds of email transactions. To then have to sift through these to find the call in details generally requires an inordinate amount of time and can be hazardous, particularly when one is traveling.

Other drawbacks with existing systems used in this space include the cost to effect the conference call. Where invitees are located in different countries of the world, the cost of the call can become instantly excessive and this is a function of call time and number of attendees. In some instances, it is possible for the cost to become so great that it outweighs the costs attributed to a face to face meeting. This problem is amplified when the meeting involves the dissemination of other media, i.e. PowerPoint, slides, previously attached documents, etc., for presentation purposes. The major impediment here relates to the technical sophistication of the attendee. If unknowledgeable, the attendee can effectively derail the conference call, by requiring extra time to collate papers, open attachments and locate materials necessary to effectively participate in the call. This generally results in the meeting becoming incomplete owing to content truncation from time constraints. This obviously contravenes the entire point of the meeting.

In the prior art, a number of suggested solutions to the enumerated limitations have been asserted.

A representative example of the prior art is set forth in U.S. Pat. No. 8,483,375, issued to Jacobstein, et. al, Jul. 9, 2013, for a system and method for joining conference calls. The specification teaches systems, methods, and non-transitory computer-readable storage media for scheduling an event to automatically join a user to a conference call.

It is indicated that the method includes receiving an invitation for a user to join a conference call and extracting a scheduled conference call time, conference call address information, conference call authentication information, and a conference call modality, and scheduling an event to join the user to the conference call via the conference call modality at the scheduled conference call time based on the conference call address information and the conference call. This is indicated in column 7 of the specification, beginning at line 11:

"The system 100 extracts from the invitation a scheduled conference call time, conference call address information, conference call authentication information, and a conference call modality (404). The system 100 can extract information via fuzzy logic, machine learning, and/or regular expressions. The system 100 can use a regular expression engine Written in Perl, Python, Ruby, and/or other suitable language. The system 100 can ask the user to confirm the extracted conference call information. In one aspect, the system 100 asks the user 20 to confirm the extracted information when the extracted information has a certainty below a threshold."

Although seeming to be particularly convenient, this system, since it chooses the extracted information, automatically usurps the privacy of the user. In certain situations, it may be that the user is on a private cell phone or using a device with high security attributes. Without the ability of the user to preauthorize his or her selected medium for connection, privacy is compromised. Further to this point, the specification stipulates in column 8, beginning at line 18: "In one aspect, the system infers the communication modality from the template or from the information extracted. For example, if the system 100 extracts a number formatted as xxx-xxx-xxxx, the system 100 can infer that the communication modality is telephone. If the system 100 extracts an address like http://WWW.myconference.com/I234/index.html, the system can infer that the communication modality is Web conference".

Perhaps one of the most potentially dangerous features of the system protocol in this patent relates to further information mining. It is discussed in column 9, beginning at line 38:

"The disclosure now turns to a more in-depth discussion of the machine learning approaches to information extraction referred to above. Machine learning algorithms can extract communication session information, such as conference bridge number and participant code, from users' emails or appointments. The system can then use the retrieved information to easily setup a communication session, for example, dialing conference bridge number and entering a participant information from people's telecommunication code, as well as popping up web conference links with limited user interaction. The system can also verify the retrieved information by monitoring users' communication sessions." [Emphasis mine].

As discussed supra, this poses a real problem where security and/or privacy require observation.

Yap et. al., in United States Patent Publication No. U.S.2012/0230485, teach a method and system for conference call scheduling using e-mail. It is indicated that e-mail can be parsed when received from a conference moderator, containing scheduling and participant information and a conference call scheduled with minimal further user intervention. The method and system can operate as a virtual administrative assistant, in this manner, to identify and collect telephone contact information for each of the proposed conference call participants. This is indicated to be achieved using a customizable hierarchy of internal and external sources of contact information. As such, the conference moderator does not need to know telephone contact information for each conference call participant.

Although a useful first generation system, the arrangement does not allow a user to select his or her own identifier in a private environment. Identifier in the sense of Applicant's technology herein is of a much broader scope and includes, for example, a Twitter address, a Facebook address, a Skype address, LinkedIn address, website address, land based phone number, cellular phone number, satellite phone number, domain name and combinations thereof. As an attendant benefit to this flexibility, the user may also change a previously indicated identifier to another one attributed to the user right up to the time of the call. This is very useful as business rarely has a definitive schedule and this feature accommodates schedule disruption, flight time changes etc. that may evolve approaching the time of the call.

In United States Patent Publication No. US2012/0230485, Yap, et. al. provide a further variation on the system and method disclosed above. It is indicated in the text that:

"As will be described in more detail below, the conference call server 55 can be adapted to use a hierarchy of internal and external sources of information to locate a telephone contact number for call participants. FIG. 6E shows an example of a contact confirmation e-mail 605 to moderator 615, Where text information 660 regarding retrieval of information regarding a contact is communicated to moderator 615 for its approval. The e-mail 605 can optionally include the source 665 of the contact information such as a Website retrieved via the Internet.

As shown in FIGS. 7A-7C, the conference call server 55 is also adapted to reach out to scheduled call participants and collect telephone contact information (via e-mail) When there is an e-mail address on file. It should be appreciated that other communication mediums can also be used to contact a participant. FIG. 7A shows an example of a contact confirmation e-mail 701 which is sent to moderator 615 stating no telephone contact information could be located for a participant 705. The e-mail 701 can include text 715 stating that an e-mail address 716 is on file for the participant 705 and that there will be an attempt to contact the participant using that address 716. FIG. 7B shows the e-mail communication 702 to address 716 providing information 722 about the scheduled call and asking for the participant 705 to respond to the e-mail. The subject line 720 also states the purpose of the e-mail (e.g., the scheduled time of the conference call, or the name of the moderator). FIG. 7C shows an example response e-mail 703 to the conference call server e-mail address 716 with a participant's contact number 725. In one embodiment, the conference call server will only accept a response from the participant's e-mail address 716 on file. In one embodiment (as shown in FIG. 7D), the conference call server 55 can send a confirmation e-mail 704 to participants (e.g., participant 6301)) whose e-mail address 717 is on file."

It is noted that other communication media can be used to contact a participant, however, no further information is provided as to how this is achieved. Further, the system noted above stipulates that it will only "will only accept a response from the participant's e-mail address 716 on file." This seems rather contradictory with the assertion that other media can be used to contact the participant.

In Applicant's system and method, it is moot if there is no email on file; the arrangement has been optimized to recognize an electronic identifier. Further, the moderator, to the extent that one is required in view of the technology, may never know the email address of the participant, let alone any other identifier.

The Yap et. al. disclosure is meritorious, but does not bring the technology to the ultimate convenience level as will be set forth herein.

Demsky et. al. in United States Publication No. 2004/0078436, teach a method of adding information to a meeting notice. The method involves within an electronic meeting notification system, a method of scheduling meetings comprising: storing meeting attribute information within a user profile of the meeting notification system, receiving a user request to schedule a meeting and prompting a user whether to automatically calling include at least a portion of the meeting attribute information within a meeting notification to be distributed to meeting participants. The system allows for calendaring and updates for the convenience of many users.

Other references which are generally relevant to the area of technology include U.S. Pat. Nos. 8,503,654, 8,483,372, United States Publications 2008/00377448, 2011/0182415, inter alia.

As a mosaic, the prior art is extensive and useful, however, there still exists a need for a conferencing method where user identifier information is maintained in privacy, the requirement for users to connect to and reschedule a call is effortless and meeting progress, participant attendance and supplemental documentation and/pertinent materials can be dynamically updated for maximum efficiency in an environment of minimal disruption.

SUMMARY OF THE INVENTION

An object of the invention is to provide a vastly improved method of electronic communication between users in a variety of arenas.

A further object of on embodiment of the present invention is to provide a method of simplifying electronic communications between a plurality of selected users, each selected user having at least one electronic identifier, comprising:

selecting a plurality of users for simultaneous contact from a provided or determined identifier of each user;

simultaneously implementing access to the identifier of each selected user of the users in the absence of action from any of the plurality of users based on a predetermined scheduled time; and simultaneously managing any respondent users from accessed identifiers.

Advantageously, when one wishes to contact several people immediately, the present technology allows for this without the burden of checking contact information, awaiting responses, dealing with tardy respondents etc. By removing the requirement for any action by a respondent, the immediacy of the contact can be effected by a single person.

Although there has been mention in the prior art of automatic calling to participants, there is a notable absence of a discussion on private identifiers for respondent users and management of the respondents to prevent, for example, the disruption of tardy participants.

Yet another object of one embodiment of the present invention is to provide a method of simplifying electronic communications between a plurality of selected users, each selected user having at least one electronic identifier, comprising;

pushing electronic information to a first user; selecting a plurality of users for simultaneous contact from a provided or determined electronic identifier of each user;

simultaneously pushing the electronic information a second time by the first user by implementing access to the identifier of each selected user of users in the absence of action from any of the plurality of users; and managing any respondent users; simultaneously forwarding managed responses to said first user.

This aspect of the invention brings the core of the technology into the realm of travel convenience. It is not uncommon for the foreign traveler to be in an unfamiliar location without having a real grasp of the surroundings without having to resort to a map or travel guide. This is inconvenient, time consuming and cannot reflect current activities or restrictions on activities desirous of the user. The technology herein allows a user to have immediate access to show times for entertainment, immediate vicinity directions to restaurants and occupancy level, updated traffic information amongst a variety of other things It is acknowledged that GPS, Google maps and other electronic aids are pervasive, however, these devices occasionally underperform or do not provide accurate information owing to the headquarters of the service, etc., where signals have to be bounced from transceiver to transceiver. In a more localized vicinal situation, the technology set forth herein obviates the need for maps, books or expensive data acquisition and provides a user with contemporary and locationally relevant information.

This characteristic of the technology brings benefit to commerce and merchandising. From an advertising point of view, the technology allows merchandise vendors to broadcast to shopper's promotional information, time limited sales, specials, giveaways to a very focused group passing within a broadcast reception area of the establishment. This is not only convenient for the shopper, etc., but also provides instant exposure for the vendor who may not have been on a shopper's radar absent the technology.

From a convenience viewpoint, the technology allows for spontaneous decisions to be fulfilled. As an example, in the vicinity of a sports arena, ticket availability could be broadcast up to the point of game time to passersby.

It is also beneficial for tourist attractions requiring an audio guide, providing instructions to a large assembly of people in an emergency situation such as best exit locations, safe areas, immediate area traffic issues among other important information. By allowing the recipient of the pushed information to push the received information to any number of second parties, the potential audience from the initial push significantly increases in exposure thereby expanding the possibility for additional revenue, customers, etc.

Yet another object of one embodiment of the present invention is to provide a method of effecting mass electronic communications between a plurality of selected users, each selected user having at least one user changeable electronic identifier, comprising:

maintaining electronic identifier anonymity of each selected user within a group of selected users;

simultaneously implementing access to the identifier of each selected user of said users in the absence of action from any of said plurality of users based on a predetermined time and on a single or mixed telecommunications platform; and simultaneously managing any respondent users from accessed identifiers.

The singular or mixed telecommunication platforms useable in the technology further elevate the appeal and user friendliness of the overall system. The costs currently inherent with existing multiple party communications are excessive. With the use of SIP, the communication with any number of selected users for any duration of time is zero. The system also accommodates mixed platforms of PSTN and SIP and any other voice or text medium.

In further features of the technology, it is another object of one embodiment of the present invention to provide a method of simplifying electronic communications between a plurality of selected users, each selected user having at least one electronic identifier, comprising:

providing a first conferencing platform and a second conferencing platform;

selecting a plurality of users for simultaneous contact from a provided or determined identifier of each user using the first conferencing platform;

identifying pre-existing users of the second conferencing platform from selected users;

providing a bridge for bridging users of the first platform and the second platform;

bridging all users; and simultaneously contacting bridged users by the identifier based on a predetermined scheduled time.

Building further still, yet another object of one embodiment of the present invention is to provide a method of simplifying electronic communications between a plurality of selected users, each selected user having at least one electronic identifier, comprising:

providing a first conferencing platform and a second conferencing platform;

selecting a plurality of users for simultaneous contact from a provided or determined identifier of each user using the first platform;

identifying pre-existing users of the second conferencing platform from selected users;

providing a bridge for bridging users of the first platform and the second platform;

simultaneously implementing access to the identifier of each selected user of the users in the absence of action from any of the plurality of users based on a predetermined scheduled time; and bridging all users at the predetermined scheduled time.

Yet another object of one embodiment of the present invention is to provide a method of simplifying electronic communications between a plurality of selected users, each selected user having at least one electronic identifier, comprising:

providing a first conferencing platform and a second conferencing platform;

selecting a plurality of users for simultaneous contact from a provided or determined identifier of each user using the first platform;

identifying pre-existing users of the second conferencing platform from selected users;

bridging pre-existing users of the second conferencing platform for automatic contact at a predetermined scheduled time;

providing a contact bridge for call in by said users of the first platform at the predetermined scheduled time;

bridging users of the first conferencing platform and the second conferencing platform for unified communication at the predetermined scheduled time; and simultaneously contacting bridged users by said identifier based on a predetermined scheduled time.

A further object of one embodiment of the present invention is to provide a method of simplifying electronic communications between a plurality of selected users, each selected user having at least one electronic identifier, comprising:

providing an electronic communication platform and a conferencing platform;

selecting a plurality of users for simultaneous contact from a provided or determined identifier of each user using the conferencing platform;

identifying pre-existing users of the conferencing platform from selected users;

bridging pre-existing users of the conferencing platform for automatic contact at a predetermined scheduled time;

issuing a communication from the electronic communication platform to additional users and bridged pre-existing users; and amalgamating the additional users and bridged pre-existing users for unified communication at a predetermined scheduled time.

In light of the efficiency gleaned from the management of the communication together with the cost savings, the system provides a robust solution to the individual and collective deficiencies stifling the prior art.

As a preliminary abridgment of the advantages inherent with this technology include:

a) the convenience for the user to provide an identifier which remains private;

b) a user changeable identifier which is changeable up to the point of connection of all users;

c) universality in accepted media of the identifiers;

d) SIP platform compatibility as well as mixed platform compatibility;

e) convenience for authorized users to be admitted to a conference at their leisure;

f) no call in number, moderator, reference code required to participate;

g) real time banner or ticker updates on progress through the agenda;

h) the flexibility of the system to provide all materials necessary for the meeting as a back up provision;

i) simultaneous calling/connection to all invitees/users;

j) a system where the users do not control the effectiveness of the group communication by activity required but rather are managed by system implementation of activity prescribed.

Other significant advantages will become transparent from a review of the details defined herein after.

Having thus generally described the invention, reference will now be made to the accompanying drawings, illustrating preferred embodiments.

BRIEF DESCRIPTION OF THE DRAWINGS

Similar numerals used in the Figures denote similar elements.

DETAILED DESCRIPTION OF THE PREFERRED EMBODIMENTS

As a preface, details concerning known aspects of the technology incorporated herein will not be repeated. The are countless telephony, PSTN, SIP and trunking references in the known literature. Further, wireless and internet concepts will not be repeated in view of the level of sophistication in these matured areas.

Figure 1:
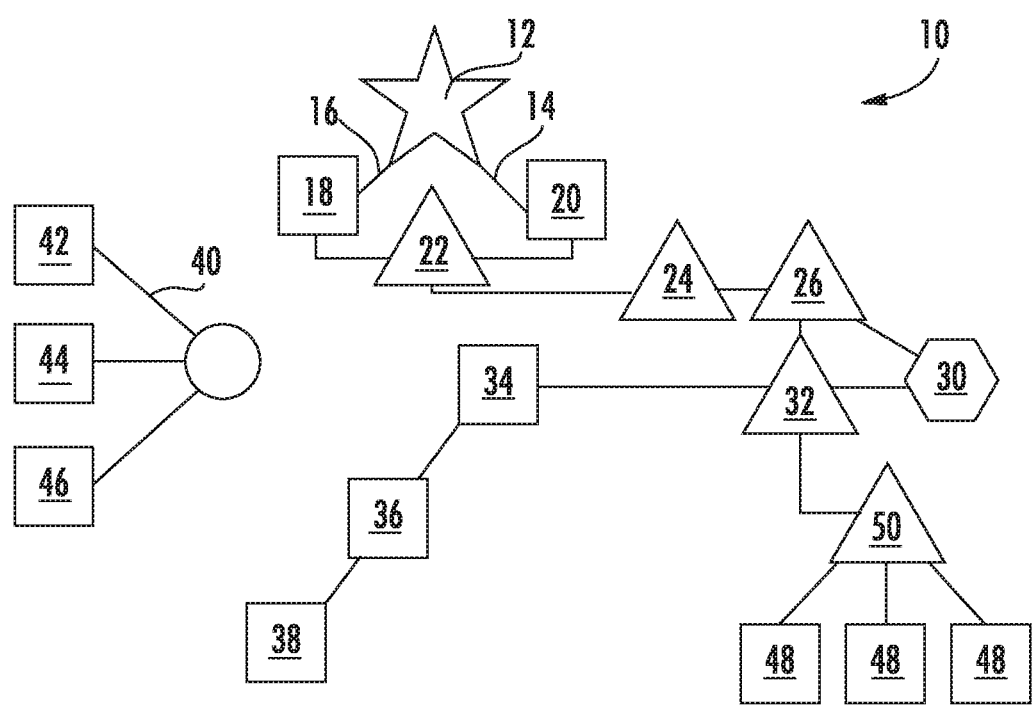
FIG. 1 is a schematic illustration of one embodiment of the present invention.

Referring now to FIG. 1, shown is a schematic illustration of one possible embodiment of the present invention. Numeral 10 denotes the entire method in general. The meeting requestor, often referred to as the host or moderator is referenced by numeral 12. User 12 wishes to contact other users 14 and 16 and does this by contacting each user by their individual electronic identifier unique to each user. In the example, user 16 is contacted via its webpage 18, with user 20 being contacted by a mobile application 20. As such, a meeting request or conference call request, for example, generally denoted by numeral 22 is sent to the users 14 and 16. This is then sent to a web service 24 and server 26. The particulars of the meeting request, i.e., estimated length, location, agenda topics, invitees, etc. are stored in a suitable database 30.

Web service 26 is in communication with a stateful application 32 which receives notification of the meeting request. The database 30 is refreshed with contemporary content by communication between server 26, database 30 and stateful application 32. In this manner, when these operations function cohesively any user input from user attendees, which will be elucidated further shortly, can be accepted by the stateful application 32, thus providing leading edge up to the minute data refreshment which is then available for distribution to the users 12, 14 inter alia.

For connectivity to the phone system, 34, the stateful application 32, once a commonly agreed upon time has been established between users, effects the bridge set up at the time of the meeting and subsequently initiates a call to all users in a simultaneous manner. As will be evident, such an arrangement is most beneficial. There is a minimum amount of input required by the user during establishment of the meeting call and zero effort to participate in the call, since the user is called by the system as opposed to conventional systems which require a user to call the system with the additional requirement to input a code for authorization and then announce his or her presence. On this last point, if simultaneous calling is not provided, the result is that users/attendees join the conference at different times leading to continuous interruptions, difficulty in properly hearing introductions or missing discussion points altogether. It is not uncommon for the initial meeting logistics to waste a significant amount of the apportioned time for the germane and salient points.

Further, the detriments noted above can be grossly exacerbated by the ill prepared or technically unsophisticated users/attendees. If the meeting requires ancillary material sent in advance to the users for use during the meeting, some users/attendees may not have opened the attachments with a view to ensuring this first can be done and that the attachment is complete and intelligible. Failure to do this occurs regularly and results in further distractions, effectively a suspension of the meeting until the users having difficulty are mitigated. As noted above, this obviously further reduces the apportioned time to the extent that, in some instances, many of the agenda items are left undiscussed thus defeating the objective of the meeting.

It is important to note that these problems arise from a lack of simultaneous call initiation to the users and further the absence of real time dissemination of ancillary materials to each user during the meeting to thus obviate those who did not prepare, download etc. as well for the technically inexperienced. In lieu of the real time dissemination, the system, at the point of invitation, can ask a user if the materials, where included, have been downloaded as a requirement to proceed with the booking.

In the instant technology, required effort for the user is significantly reduced and where required is streamlined to the point that maximum efficiency results. This aspect of the technology will now be discussed.

The relationship between the stateful application 32, database 30 and web server 26 has been established in the discussion previously. Once all of the requisite data has been collected to effect the calls, the stateful application 32 connects with the phone system 34 and disseminates the information to all of the different media of the users. This can be by PSTN 36 to a phone 38, IP to an SIP client 40 by a trunk therefor 42, Skype 44 or any other medium 46 well known in the art.

The stateful application 32 is linked to users by their devices to be pushed notifications, updates in content, meeting time, etc. These notifications can be sent to the stateful application 32 by the host or moderator 50 for up to the minute dispersion to the users 48.

The benefits of the simultaneous calling have been enumerated above. However, this feature when linked with the information regulation operation of the stateful application, greatly reduces the amount of responses that would otherwise be required in prior art systems. As an example, by virtue of the fact that all users can be contacted simultaneously, the time for them to respond with agreement or further suggestion is faster. The reduction in responses to further suggested call times is realized with a time box feature. This presents a period interval suggested to users sufficiently lengthy to ensure high probability that all users will be in attendance within the interval. The system then collates all responses, analyzes the information for a common acceptable time and disseminates the information. Clearly, this is more convenient and efficient than having all users have to repeatedly respond to alternate times that are suggested. As will be appreciated, this could be exceeding time consuming where there are a large number of users.

The users who have selected a time in the time period interval can also initiate a "timeout" within the time box described above.

Owing to the ubiquitous electronic identifier compatibility, a major feature of the inventive technology herein is vividly comprehensible, namely privacy.

Where the users can be contacted with other media, key phone numbers, i.e. cell, home, satellite never have to be known to any other user or host/moderator. The system allows the user to provide a suitable identifier it chooses for use as a contact. Fortunately, this feature is enriched by the fact that the system affords the user with the capacity to change the identifier it wishes to use right up until the scheduled time for the contact.

All identifiers used in the system remain private and may be scrambled by a suitable algorithm well known in the art and stored as such.

Since the system facilitates such a high degree of security and privacy, use in delicate environments with sensitive information is very desirable. The fact that the user does not have a call in code requirement, eliminates the possibility of unauthorized persons from listening to the subject matter of the call should the call in code be comprised by illicit activity. This coupled with the fact that the user can select the identifier to be used, change it at the last minute and store privately in a scrambled form enforces the robustness of the methodology even in the most demanding environments.

Figure 1A:
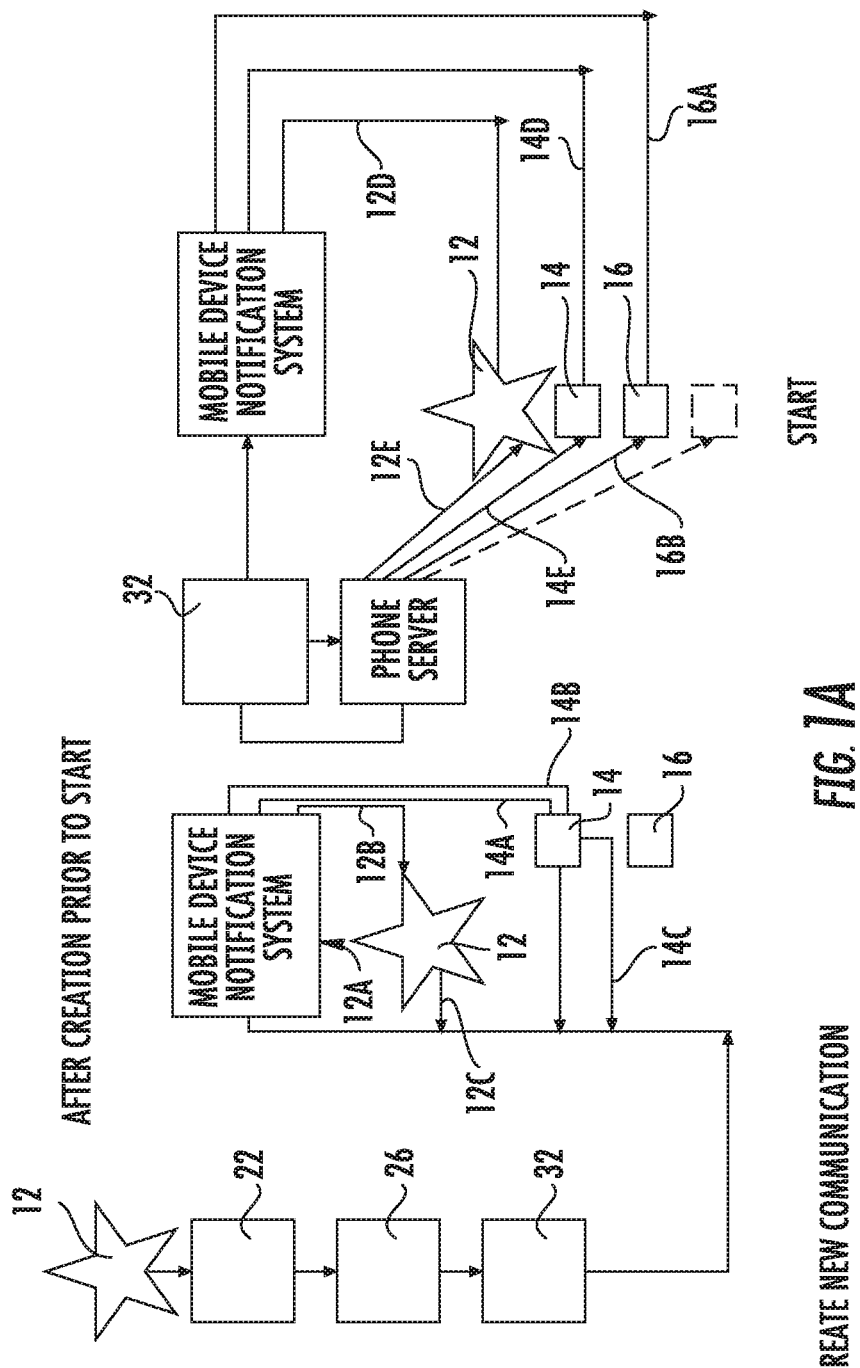
FIG. 1A is a schematic illustration is a more detailed depiction of FIG. 1.

FIG. 1A is a schematic illustration of one example of the simplified overall method and system. The host/moderator 12 sends a request for communication for contact with selected users 14 and 16. Stateful application 32 sends notifications to a mobile device notification system, an example of which is Apple push notification service. The notification system can send reminders to the users 14 and 16 as well as host/moderator 12 at 12A and the system can optionally send to the host/moderator 12 at 12B asking, for example, for approval of the time for the communication. Further, host/moderator 12 can ask for a delay or approve at 12C. This information can be pushed from the notification system to user 14 at 14A as well as delay request denial at 14B. As an option, user 14 may request a delay at 14C.

At the start of the communication, stateful application 32 instructs phone server to create a conference bridge. Stateful application 32 sends notifications to all selected users 12, 14 and 16 at 12D, 14D and 16A. For other users (chain line) not subscribed to the method, older media may used for purposes of communication. One example is Skype.

The next step in the method involves contacting all selected users. This is done via the phone server which is capable of handling SIP and PSTN. As an example, users 12 and 14 are contacted by a SIP line at 12E and 14E, respectively while user 16 is contacted by a PSTN line at 16B. Other users (chain line) can be contacted by older media, such as Skype.

Figure 2:
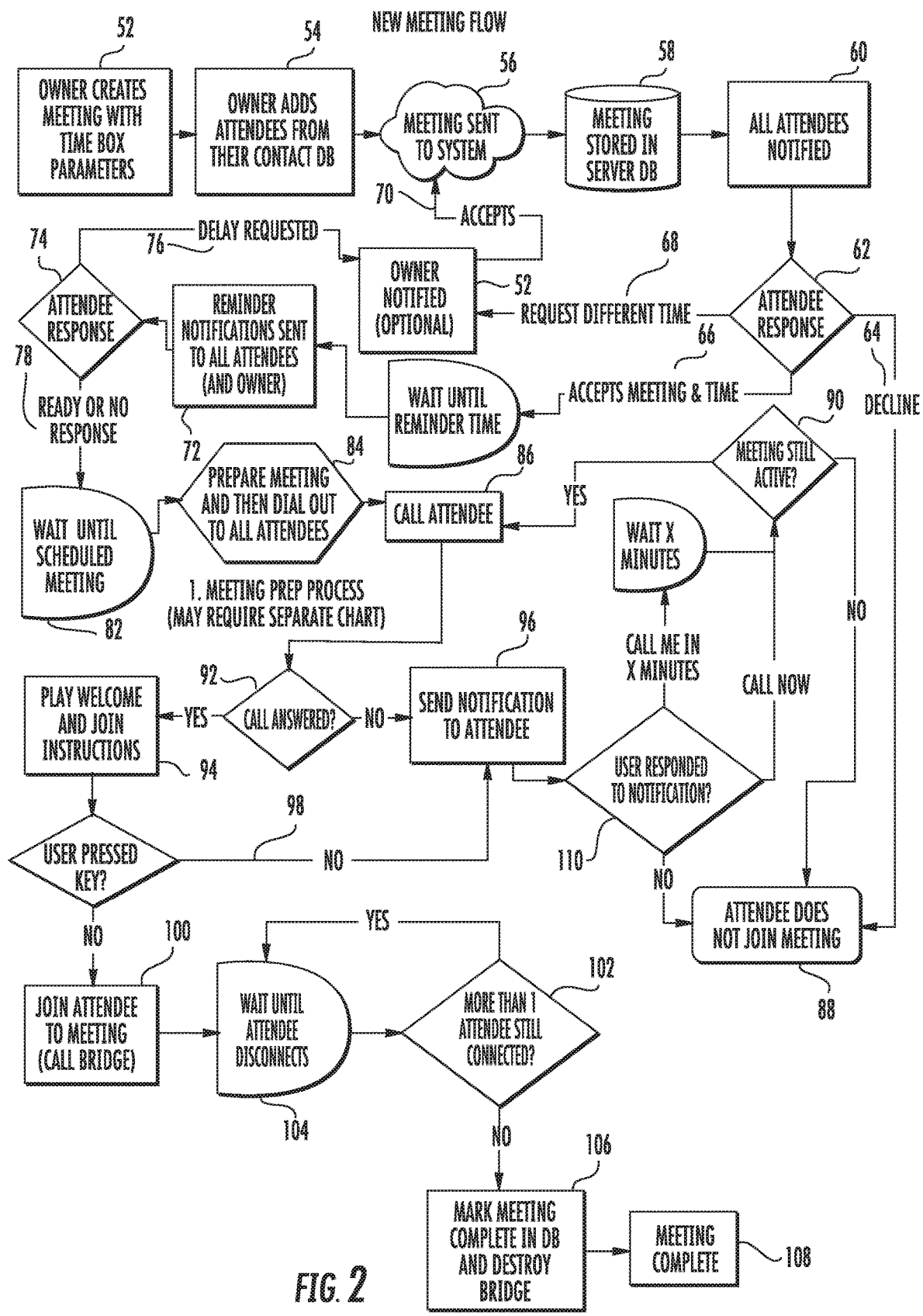
FIG. 2 is a schematic illustration of another embodiment of the present invention.

Referring now to FIG. 2, another variation is depicted. In this example, a user 52 opens a meeting request with a time box interval supra. The user 52 adds selected attendees from a database containing requisite information. This step is denoted by numeral 54. The meeting information is sent to a web server and the information is stored in the server database 58. At this point, all of the selected attendees are notified 60. The selected attendee can respond 62, by declining 64, accepting the meeting and scheduled time 66 or requesting an alternative time 68. The user 52 may optionally be informed of the request for a different time at 70 with acceptance.

In the scenario where the selected attendee accepts 66, then there is nothing left for the attendee to do until such time as an optional reminder is sent to all selected attendees 72 and the user 52 who effected the meeting request initially. The selected attendees respond 74 and if a delay is requested at 76 this is, in turn, conveyed to the user 52 as illustrated. After the response 74 of the selected attendees, if there is no response or an indication of readiness 78, then the system will then wait until the scheduled meeting time 80 before commencing any further activity 82. The further activity effected is to prepare the meeting and dial out to all attendees 84, 86.

Returning to the declined response 64, in the scenario where the selected attendee does not join the meeting 88, a determination can be made as to whether the meeting is still active. If yes, then the inquiring selected attendee is informed by the call being answered 92 and welcome messages/instructions delivered 94. If the call is not answered, a notification 96 is sent to the selected attendee.

At the instruction and welcome phase, if the user key attributed to the user has not been detonated, a notification is sent 98. If a negative response to the user key detonation is received, the attendee is call bridged in. If more than one selected attendee is still connected, the system waits for the selected attendee to disconnect 104. In the event that not more than one selected attendee remains connected, then the meeting is marked as complete in the database 58 and the bridge destroyed 106 for call completion 108.

Returning to the scenario where the meeting is still active 90, the selected user who sent the notification at 96, can query if user responded to the notification 110. In the negative, the selected attendee does nothing further or sends out a message to call at a certain specified point in time.

Figure 3:
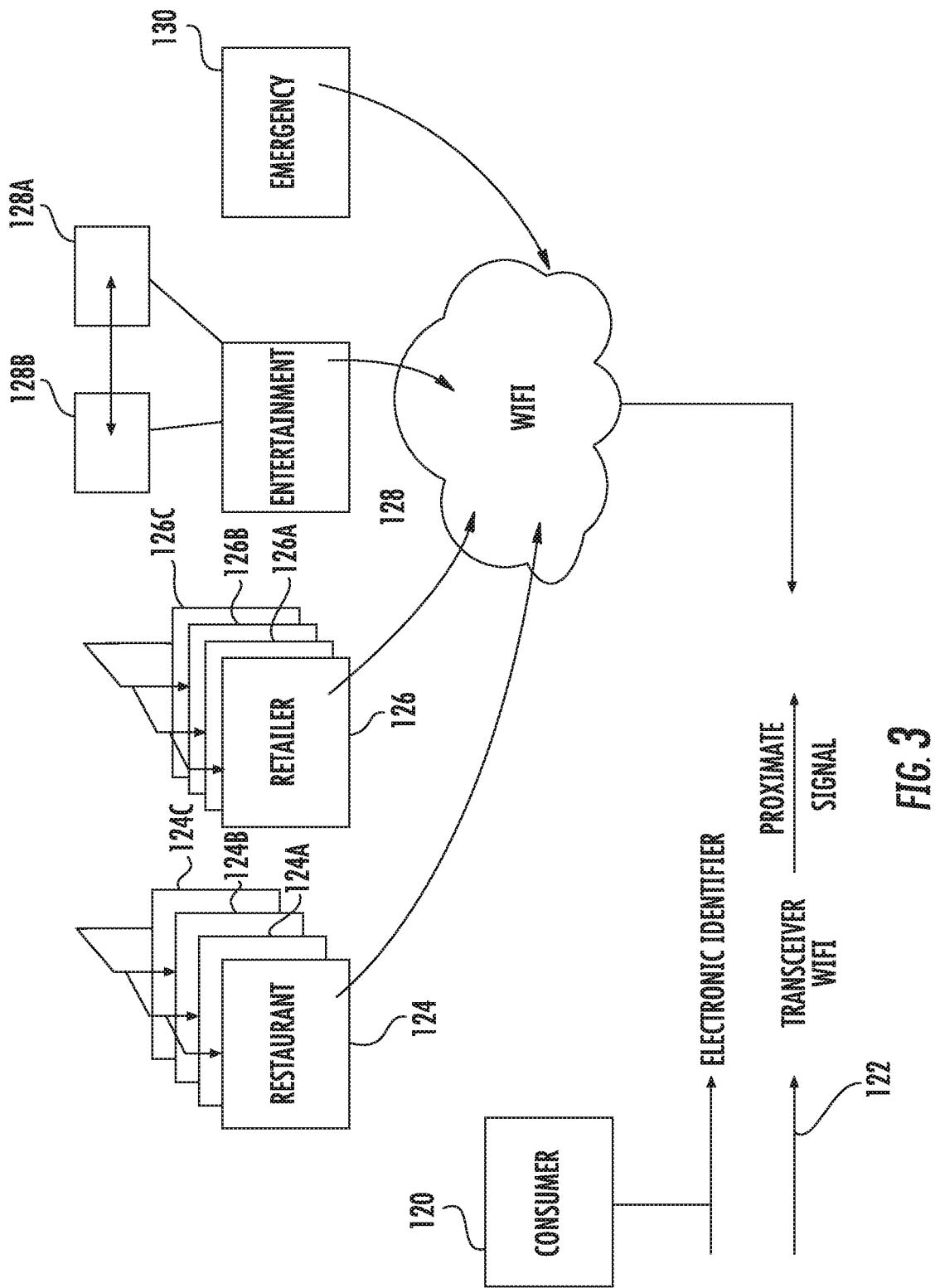
FIG. 3 is schematic illustration of another embodiment of the present invention.

Turning now to FIG. 3, shown is a schematic illustration of the technology as used in a commercial environment. In this embodiment, as an example, Wi-Fi is incorporated to effect zone proximate information to, for example, a consumer passing by a vendor's establishment. Other applications other than Wi-Fi will be apparent to those skilled. In reference to FIG. 3, the consumer is represented by numeral 120 having an electronic identifier and transceiver device 122, such as a tablet, smartphone etc. Numerals 124, 126, 128 and 130 represent a restaurant, retailer, entertainment complex or ticket vendor and a source of up to the minute emergency instructions/news, respectively. The benefit here is that the technology discussed herein can facilitate truly contemporary electronic communication between the consumer 120 and any one of or all establishments 124 through 130.

Having the platform technology discussed herein, the consumer 120 who passes within a broadcast zone of, for example, the restaurant, the owner could push promotional information to the consumer encroaching the broadcast area. this could take the form of time limited specials, happy hour information, reservation requirements etc. Further, competing restaurants represented by numerals 124A, 124B, 124C, could be accessed by advertising to the consumer based on the preferences gathered from customer interaction with restaurant 124.

In a similar manner, retailers 126 could participate by announcing time limited sales, giveaways, buy one get one, gift with purchase, etc. Retailers 126A, 126B and 126C all could be accessed for size, color and style availability in the case of garments.

Turning to the entertainment aspect 128, a passerby of a sports stadium could be pushed up to the minute information on ticket availability for events that evening, upcoming events, current scores, etc. This broadcast could also be linked to theatre ticket availability and opera information, for example, denoted by numeral 128B.

In summary, two key aspects for effective electronic communication have been unified to result in modern use of telecommunication technologies. By unifying efficiency in scheduling a communication session with effective contact of the parties for the session, the limitations in existing systems have been eliminated for a more professional and temporally efficient way to communicate.

From the scheduling point of view, the capacity to accept any medium specified for use by the user with the option for exchange to another medium associated with that user up to the last minute based on schedule requirements definitively provides a high level of privacy and security. This is in marked contrast to the use of call in codes, call in numbers, moderator codes, etc. all of which are easily compromised. In the scheduling protocol of the present invention, the concept of a call in number is moot; electronic identifiers act as a key for the system to contact the user in vastly sophisticated and secure operation.

The calling facet dovetails with the scheduling protocol to result in a complete system. The calling aspect permits user interaction to reduce the overall amount of transactions that would otherwise occur. Users can delay connection to the call and have a predetermined alert to join or postpone for an additional predetermined period. Unanswered calls for attendance will now be simply redialed without the annoyance of a voicemail announcement. For authorization to participate, the user may have to agree that it has any attachments requisite for the call downloaded and ready for access. This will be augmented by providing the materials as an accessible file during the session. Further, real time information updates will be simulcast with the session, in ticker tape fashion such as persons in attendance, meeting progress, departed users, upcoming agenda items, web links for further information on a selected topic and the possibility to schedule attendance at any future follow up meetings. All of these features are dramatically enhanced on the scheduling platform and the fact that these two are unified and can be simultaneously delivered to all users for cohesive professional meetings.

Figure 4:
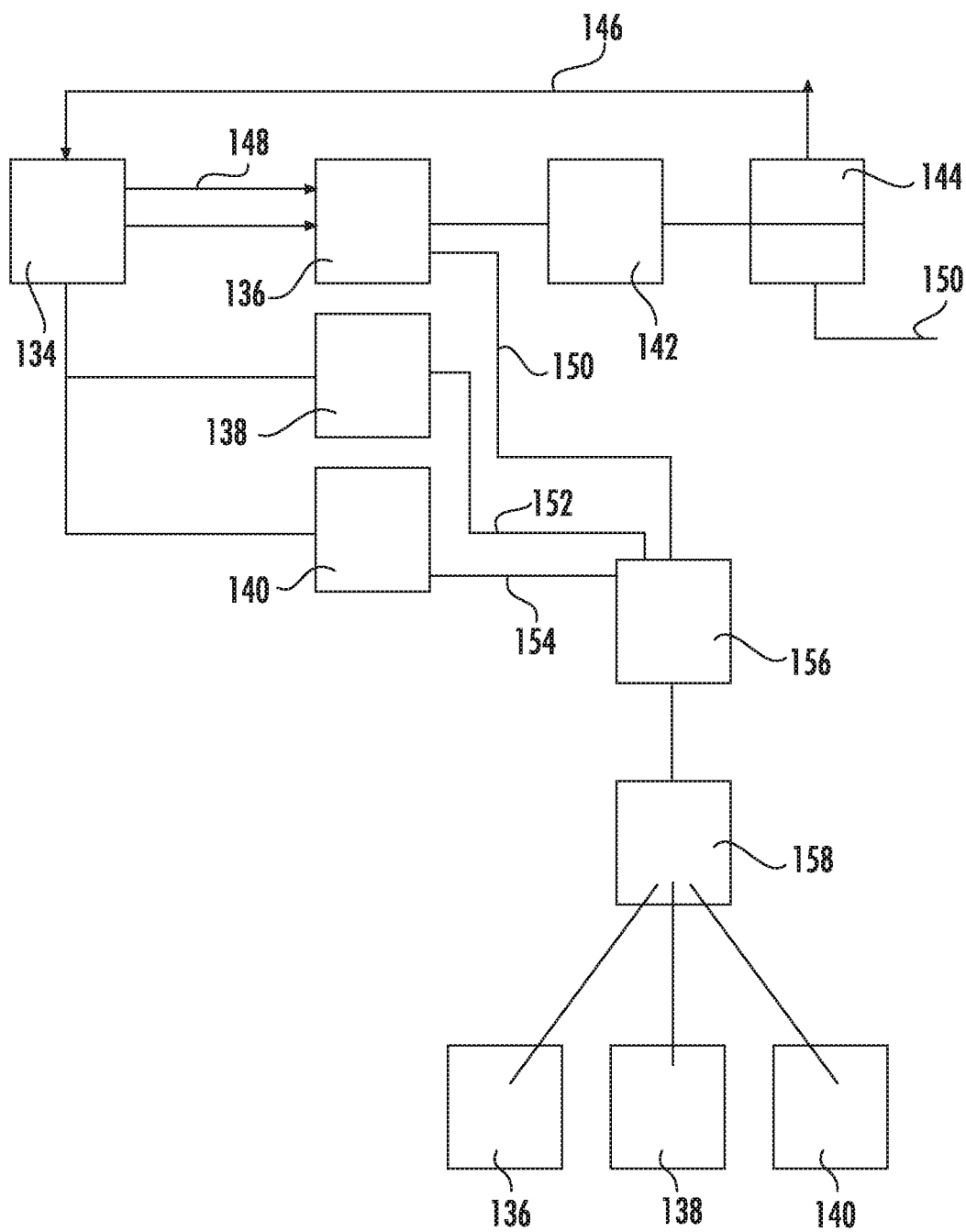
FIG. 4 is a schematic illustration of a further embodiment of the present invention.

With reference now to FIG. 4, shown is a further embodiment of the present invention. In this embodiment, database 134 accesses the electronic address of each user 136, 138, 140, respectively, which users may have any device for access as discussed herein previously. Identity of each user 136, 138 and 140 is confirmed. In the scenario where the user device is a phone, it is clear that there is a possibility that an unauthorized user could answer when accessed by database 134. Conveniently and consistent with the security attributes of the methodology, unauthorized use is prevented. If the possible unauthorized user, shown in the example as user 136, attempts to be a party to the meeting, information or call he or she will be prompted for a PIN (personal identification number) associated or tagged with and unique to each user. This PIN is intended for a one time use at subscription of the service for each user and is not required for further entry by the user subsequent to completion of the initial subscription 23 requirements. In this manner, the PIN is secret.

Upon detection of an unauthorized user, he or she is prompted for the PIN, generally denoted by numeral 142 and if the correct PIN is entered and sent 146 to database 134, access is granted 148. If no PIN is entered or is incorrect, the user 136 is terminated 150 from further access.

At this point, responses 150, 152 and 154 to information sent to each user 136, 138 and 140 are collected and analyzed for commonality at 156. Upon completion of the analysis for commonality, a common response 158 is ascertained and disseminated simultaneously to each user 136, 138 and 140. This is a convenient further layer of security for the system which is an advancement in the art. This is exemplary only; the PIN may be discarded or combined with other secure technologies such as biometrics, examples of which have been mentioned herein previously.

Figure 5:
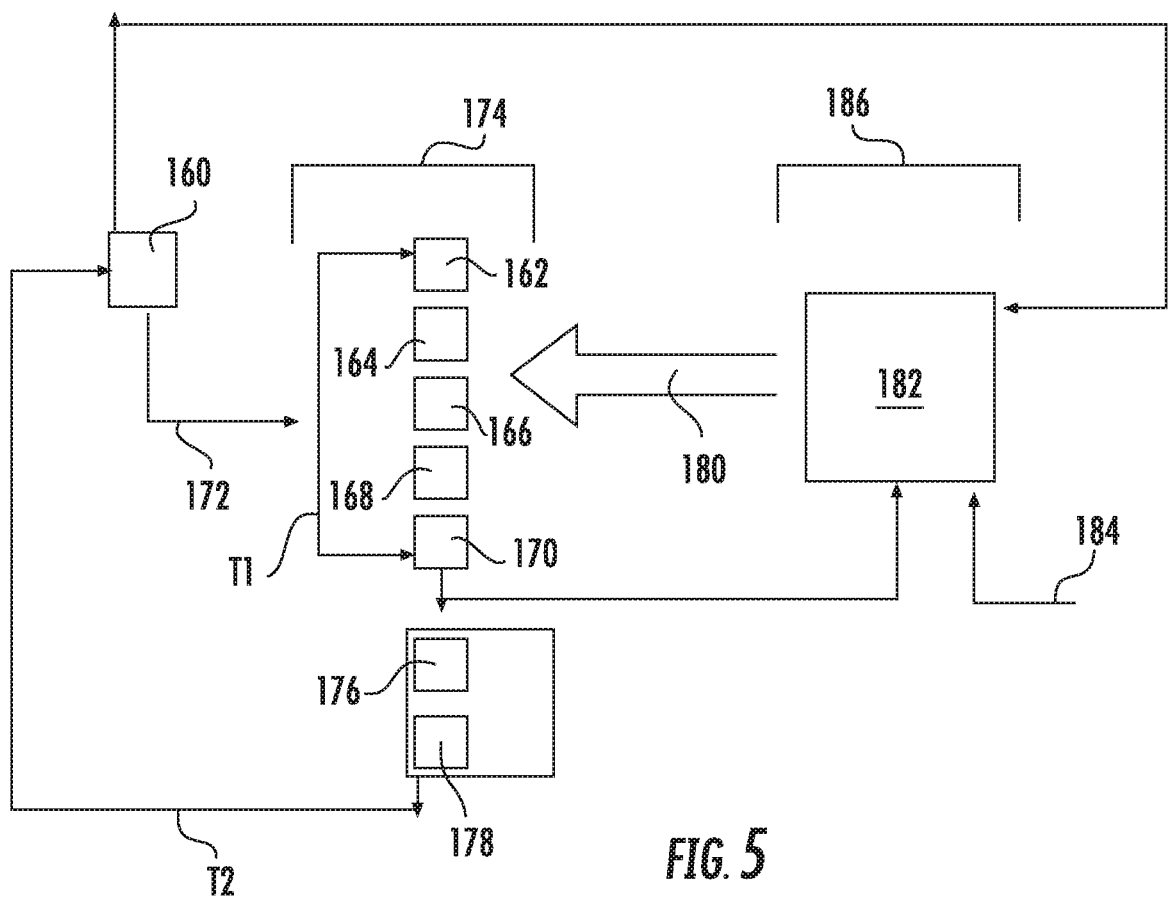
FIG. 5 is a schematic illustration of the implementation and management elements.

Turning to FIG. 5, shown is a schematic for implementation and management phases of a scheduled call. In the event that user 160 wishes to simultaneously contact a number of selected users 162, 164,166,168 and 170 either urgently or based on a time pre-decided by the users from a method previously discussed, the user 160 can do so by contacting the electronic identifiers of the selected users 162 through 170 at time T1 via telecommunications platform 172 which can be a singular platform PSTN, SIP or a mixed or hybrid platform of SIP and PSTN, as an example. In this manner, all selected users 162 through 170 are all simultaneously contacted at T1. This is referenced as the implementation phase 174.

In the event that other selected users 176 and 178 are not responding at T1, but attempt to participate by contacting user 160 at T2, the users 176 and 178 are blocked from participating and granted access at the discretion of user 160.

For purposes of information dissemination during implementation of the communication, users may be updated with agenda progress, up to the minute details, images, collated information from the users during the communication, etc. by pushed information 180. All, some or none of the users 162 through 170 as well as user 160 may add new information to a database 182 or information may be collected extraneously at 184 via news feeds, web crawling, topic recognition inter alia. This is generally referred to as the management phase 186 and it is predicated upon artificial intelligence.

Figure 6:
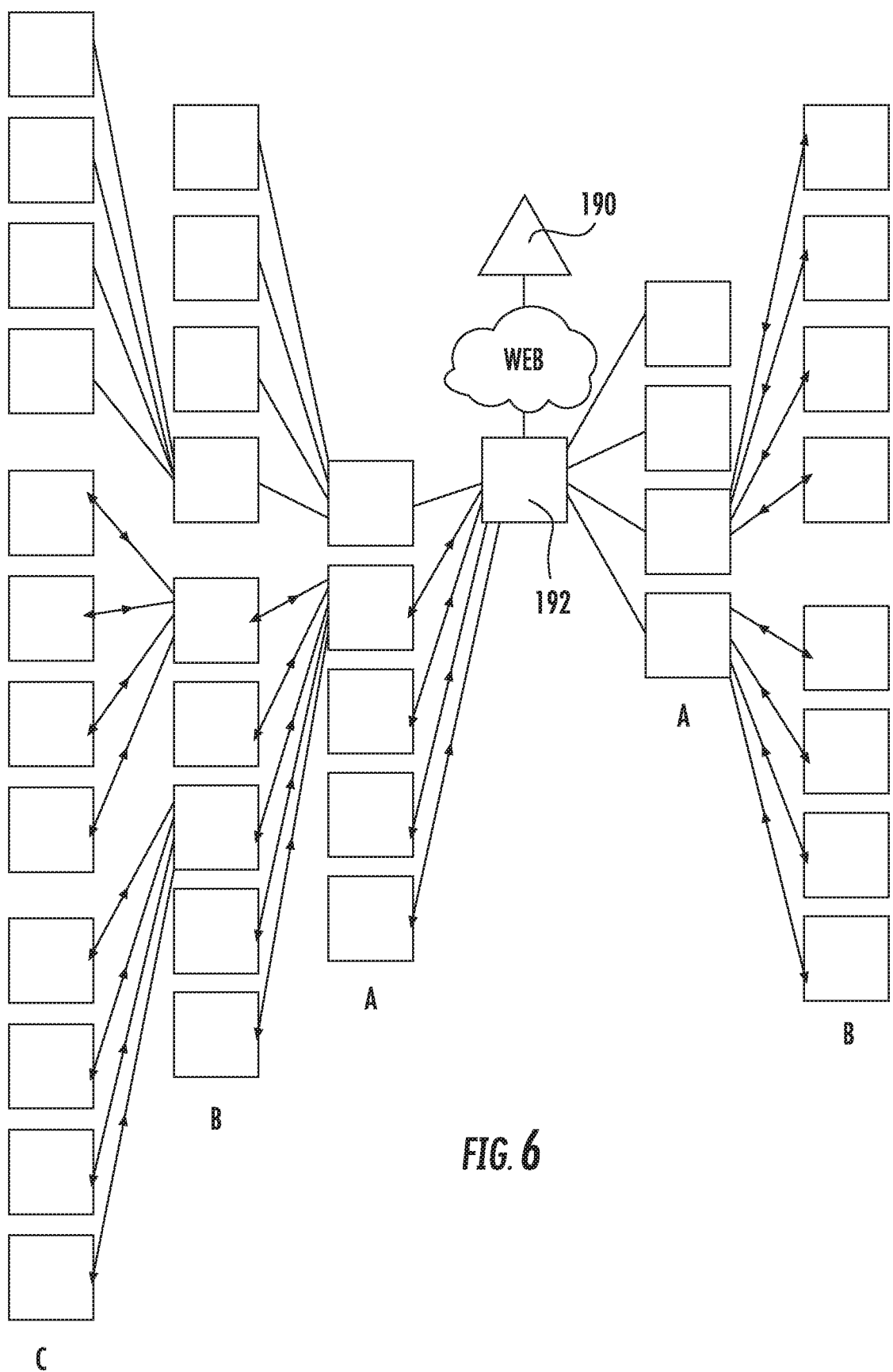
FIG. 6 is a schematic illustration of a primary and secondary push system.

FIG. 6 schematically illustrates an embodiment of the invention similar to FIG. 3, using similar principles but using a second push of information by a recipient of the information. In this embodiment, an institution, vendor, etc. is represented by numeral 190 and a user by 192. As referenced supra upon encroachment of user 192 within the pushed information sent by vendor 190, the information is received by user 192. User 192 is then capable of contacting any number of users in groups A through the implementation discussed regarding FIG. 5 by a simultaneous second push as illustrated. The user 192 in this scenario, may augment the second push with additional information. Accordingly, in the case of advertising material, the initial push from vendor 190 is exposed to a vast number of potential customers without having to take action, a valuable benefit shared by the users of groups A who remain passive until such time as they wish to push to groups B. Clearly, the feature of being able to simultaneously and instantly communicate with any number of users selected by a user has far reaching benefit. Further still, any one or all of the contacted users within a group can act as the user 190 to establish back and forth communication with any one or all of the users within a respective group. Group C is a further layer in the sequence. It will be apparent to those skilled that any number of branches can be added to the overall system and that anonymity of the electronic identifiers of the users can be preserved.

Figure 7:
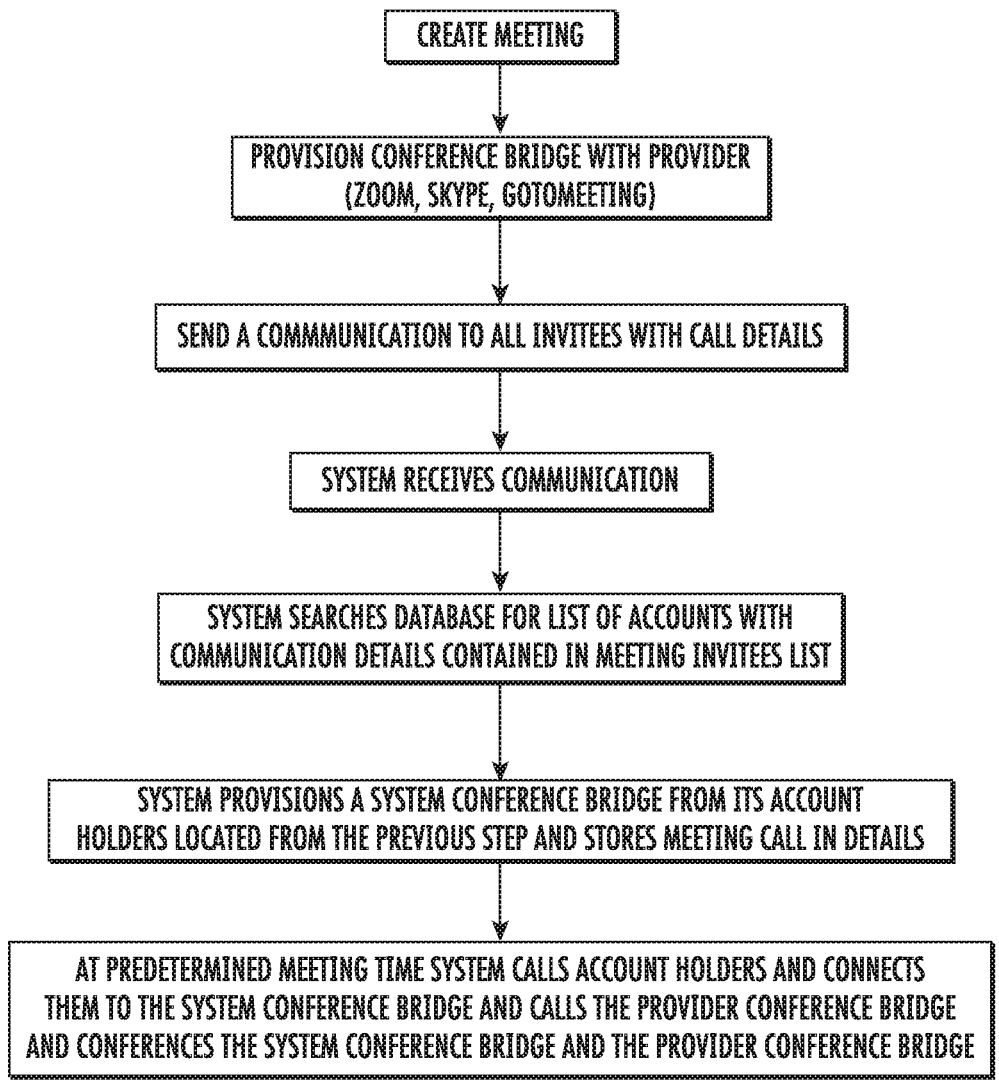
FIG. 7 is a flow diagram depicting a further embodiment.

As a further variation to the technology discussed herein, FIG. 7 provides a verbal overview of the variation.

Figure 8:
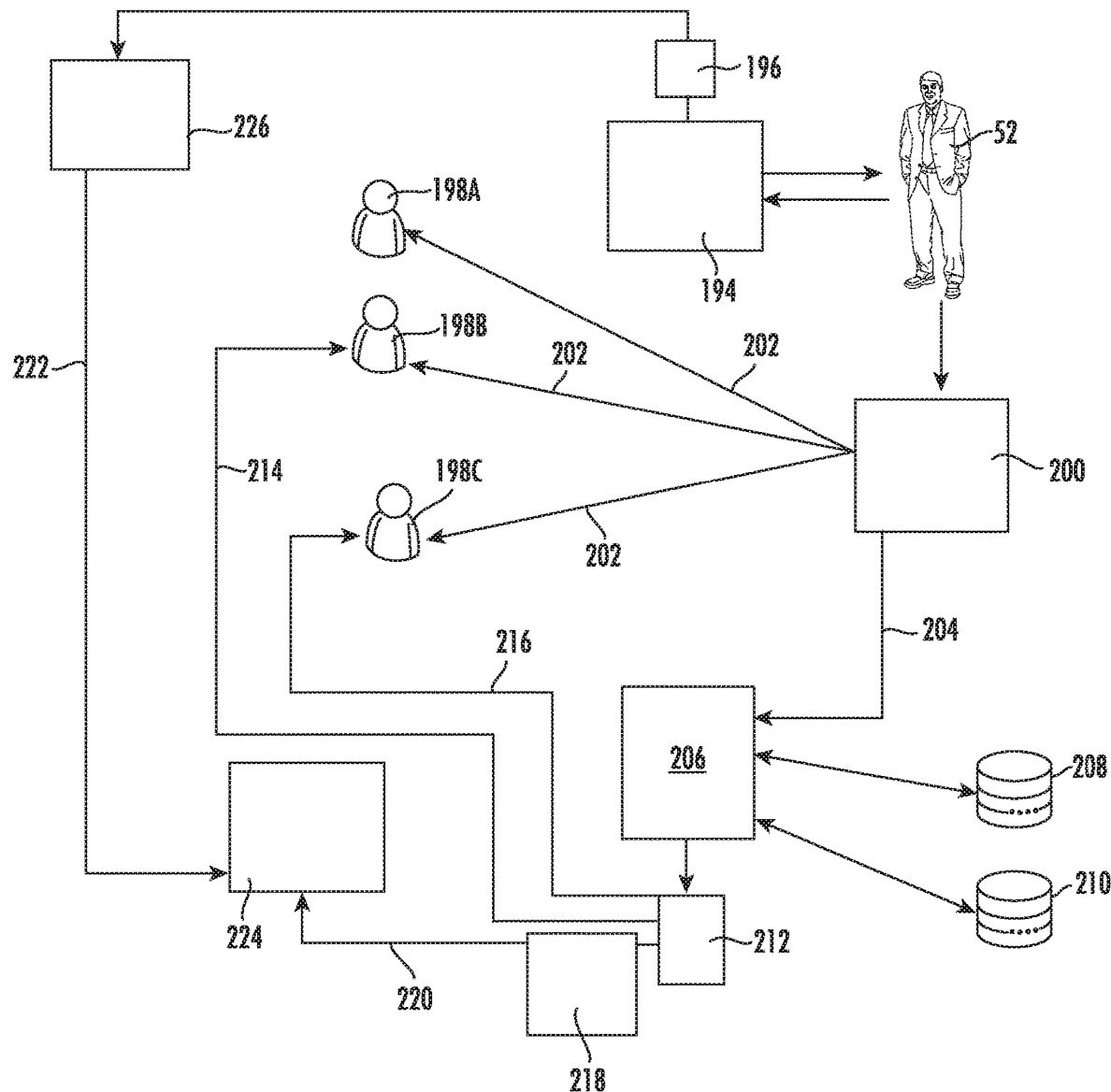
FIG. 8 is a schematic illustration of the embodiment of FIG. 7.

Referring now to FIG. 8, shown is a schematic illustration of a further embodiment of the present invention generalized in FIG. 7. In this embodiment, owner (meeting chair) 52 establishes a meeting with a conferencing platform 194, examples of which may be GoToMeeting, Zoom, Skype, etc. all of which are well known, amongst others, in the existing art. Conference details are then conveyed to owner 52 as shown by the arrows. Conferencing platform 194 is operatively connected to a phone system (PSTN) 196, which may be substituted/combined with a SIP system as will be appreciated by those skilled in the art.

The owner 52 contacts invitees (users) 198A, 198B and 198C by contacting email server 200, which may be a plurality of intercommunicating servers, with the meeting details, represented by numeral 202. The owner 52 can also instruct the conferencing platform 194 to do this. At this time, the owner 52 may optionally send a further identifier email 204 which is effectively another invitee or additional user, from an electronic viewpoint.

Identifier email 204 contacts a second platform 206 which operates on a different protocol from that of platform 194. In this example, second platform 206 may comprise the system described herein in respect of FIGS. 1 through 6. The platforms may be similar or different, such as a social media platform and a conferencing platform. Numerous other variations are well within the scope of this technology.

Platform 206 parses the email into data elements such as existing users for platform 206, call in details, subject matter of the meeting/communication, start time and any other salient information. Platform 206 references existing user database 208. Call details are retained in call detail database 210.

Platform 206 is also operatively connected to a phone system (PSTN) 212, which may be substituted/combined with a SIP system as noted above with respect to system 196. This communicates the necessary parsed information to existing users 198B and 198C of the platform 206 at 214 and 216, respectively.

Phone system 212 communicates with a bridge 218 created by phone system 212 and similarly, phone system 196 communicates with a second bridge 226. Bridge 218 subsequently connects to a bridge connector 224 via 220. Second bridge 226 also connects to bridge connector 224 via 222. In this manner, bridge connector 224 interfaces bridges 226 and 224 for unification of same. This will be discussed in greater detail in the following paragraphs.

Identifier email 204 may be sent out at anytime before bridging and by anyone one or all of owner 52 or users 198A, 198B or 198C. This is possible since identifier email 204 triggers the steps for bridging. In this manner when platform 206 comprises the system described herein previously with respect to FIGS. 1 through 6, the identifier email switches from a passive inclusion to a systems management bridging initiator.

In operation, when the conference/meeting is to be opened, platform 206 contacts its existing users, 198B and 198C via 214 and 216, respectively while user 198A calls in to the bridge 226 based on the information previously conveyed via 202 from email server 200.

At this point there are two dissimilar platforms 194 and 206 queued at the set time for the meeting/conference. Bridge connection 224 amalgamates both platforms for intercommunication. This is marked advance in this area of technology and is consistent with the prevailing theme of simplified communication regardless of electronic identifier type, conference platform. In light of this, it will be appreciated by those skilled in the art that users 198A, 198B and 198C can be conveyed the meeting/communication details by any of the electronic identifiers attributed to each user.

Figure 9:
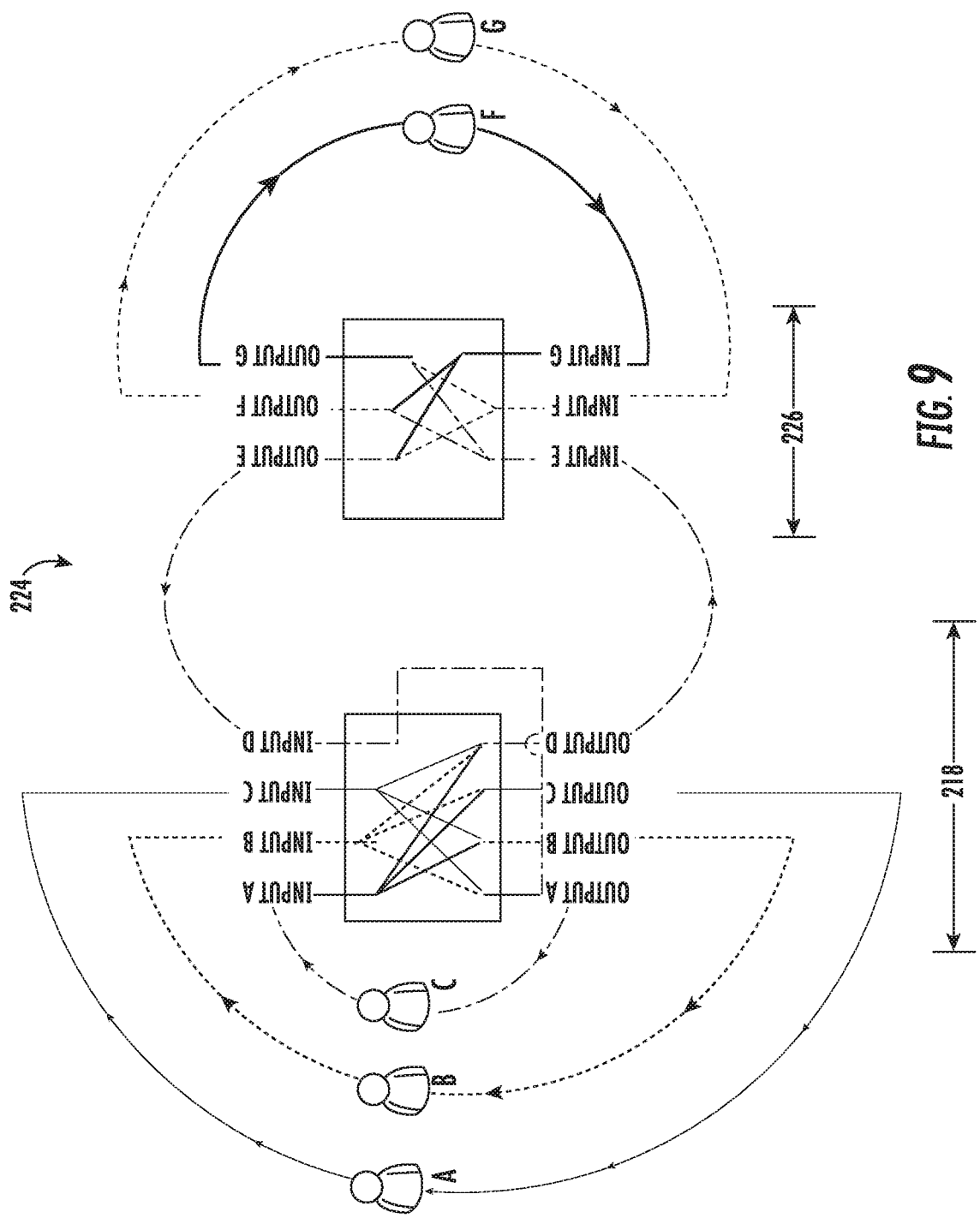
FIG. 9 is a schematic illustration of the bridging system employed in FIG. 8.

FIG. 9 is a schematic illustration of the bridging system in greater detail.

Bridged and connected users A, B and C from platform 206 exist on bridge 218 and users F and G from platform 194 exist on bridge 226. The bridges are linked in bridge connector 224 as shown. For clarity, the signal path is indicated by the arrow designation on each individual path. In respect of the connections and for further clarity, the connections are as follows:

User A on bridge 218 has an input connected to input C integrated to outputs A, B and D.
User B on bridge 218 has an input connected to input B integrated to outputs A, C and D.
User C on bridge 218 has an input connected to input A integrated to outputs B, C and D.
User F on bridge 226 has an input connected to input G integrated to outputs E and F.
User G on bridge 226 has an input connected to input F integrated to outputs E and G.

In respect of the bridge connector 224, output D from bridge 218 is integrated to input E on bridge 226 and subsequently to output F and G. Output E of bridge 226 is connected to input D of bridge 218 and subsequently connected to output A, B and C.

Numerous iterations of the technology have been set forth herein. The prevailing theme with the instant technology is, however, implementation of mass communication simultaneously and instantly with optional activity by a user for secondary communication. Present systems can effect simultaneous contact with users, but the existing arrangements are essentially scheduling protocols; users still are required to assume an active roll by doing some activity which ultimately has an impact on the effectiveness of existing systems. In contrast, simultaneous and instantaneous communication absent user activity are attributes of call implementation and management. The user remains passive and thus the communication is automatically implemented and managed in an efficient, temporally precise and private environment.

In summary, numerous features evolve from the technology. Where the system is to provide an election of time for communication, which is then subsequently disseminated, the steps include providing an electronic identifier unique to each user if one is not already attributed and a notification transceiver for communicating with the electronic identifier. Suggested scheduling information may be sent to selected users through the notification transceiver with amalgamation of the responses from the selected users regardless of the type of identifier. From this, a common schedule time is determined and the selected users are simultaneously contacted at the common schedule time.

The electronic identifier may be a Twitter address, a Facebook address, a Skype address, LinkedIn address, website address, email address, land based phone number, cellular phone number, text message, short message service (SMS), Smart Messaging, extended message service (EMS), multimedia messaging service (MMS), email and combinations thereof.

As an option non selected user access to the event scheduled before, during and after the common schedule time. Further, reminder advice may be sent to each selected user at a predetermined time in advance of the common schedule time as well as an agenda and concomitant accoutrement requisite for an event associated with the common schedule time.

Conveniently, updated information and agenda progress can be audibly or visually provided to each selected user prior to and during the common schedule time. The method is operable with mixed media electronic identifiers and over local area network environment (LAN) or a wide area network (WAN).

In further features, preferential communication can be established between a plurality of users based on the location of said users. As an example, a query may be transmitted from a user at a specific location and the responses amalgamate from the users. The responses are sorted as to which are preferential and the user is automatically contacted at the location only with preferential responses at the location.

The query may be based on goods and service information at or immediately proximate the location of the user initiating the query.

The preferential responses, if unavailable, cue the next most desirable response to be communicated to the user from the preferential responses. As a further step, the preferential responses could be converted with a subscription agreement for using the methodology and payment of fees. As examples, the preferential responses include website, social media information and general contact information which are automatically stored in the appropriate locations in the mobile device of said user with the query.

We claim:

1. A method of simplifying electronic communications between a plurality of users, each user having at least one electronic identifier, comprising:
   a) providing a first conferencing and scheduling platform and a second conferencing and scheduling platform;
   b) selecting a plurality of first users of a plurality of users of said first conferencing and scheduling platform for simultaneous contact from a provided or determined identifier of each user of a plurality of users using said first conferencing and scheduling platform;
   c) identifying second pre-existing users of a plurality of users of said second conferencing and scheduling platform;
   d) providing a bridge for bridging said selected plurality of first users and said identified second pre-existing users;
   e) creating bridged users using said provided bridge by bridging said selected plurality of first users and said second identified pre-existing user;
   f) simultaneously contacting said bridged users by said determined identifier of each user based on a predetermined scheduled time; and
   g) effecting steps a) through f) in the absence of any action by said users.

2. The method as set forth in claim 1, wherein said first conferencing and scheduling platform and a second conferencing and scheduling platform comprise dissimilar conferencing platforms.

3. The method as set forth in claim 1, wherein said electronic identifier is selected from the group comprising: a Twitter address, a Facebook address, a Skype address, LinkedIN address, website address, email address, land based phone number, cellular phone number, satellite phone number, domain name, text messaging, short message service (SMS), Smart Messaging, extended message service (EMS), multimedia messaging service (MMS), email, proprietary systems, social media platform and combinations thereof.

4. The method as set forth in claim 1, wherein said method includes adding an additional user to selected users.

5. The method as set forth in claim 4, wherein said additional user is a determiner electronic identifier for parsing by said second conferencing and scheduling platform to determine said pre-existing users.

6. The method as set forth in claim 1, wherein said parsing includes determining selected users, predetermined scheduled time, reason for bridging users and an ancillary information.

7. The method as set forth in claim 5, wherein said additional user is selected for contact at any time prior to bridging.

8. The method as set forth in claim 1, wherein anonymity of said electronic identifier of a selected user is maintained amidst all selected users.

9. A method of simplifying electronic communications between a plurality of users, each selected user having at least one electronic identifier, comprising:
   a) providing a first conferencing platform and scheduling platform and a second conferencing and scheduling platform;
   b) selecting a plurality of first users for simultaneous contact from a provided or determined identifier of each user of a plurality of users using said first conferencing and scheduling platform;
   c) identifying second pre-existing users of a plurality of users using said second conferencing and scheduling platform;
   d) bridging said identified second pre-existing users of said second conferencing and scheduling platform for automatic contact at a predetermined scheduled time;
   e) providing a contact bridge for call in by said selected plurality of first users at said predetermined scheduled time;
   f) creating bridged users using said contact bridge by bridging said selected plurality of first users and said identified second pre-existing users for unified communication at said predetermined scheduled time;
   g) simultaneously and automatically contacting bridged users by said identifier based on a predetermined scheduled time; and
   h) effecting steps a) through g) in the absence of any action by said users.

10. A method of simplifying electronic communications between a plurality of users, each user having at least one electronic identifier, comprising:
    a) providing a first conferencing and scheduling platform and a second conferencing and scheduling platform;
    b) selecting a plurality of users for simultaneous contact from a provided or determined identifier of each user using said conferencing and scheduling platform;
    c) identifying pre-existing users of said second conferencing and scheduling platform from said plurality of users;
    d) creating bridged users by bridging said pre-existing users of said second conferencing and scheduling platform for automatic contact at a predetermined scheduled time;
    e) issuing a communication from said first conferencing platform and scheduling platform to additional users of said plurality of users and bridged pre-existing users;
    f) amalgamating said additional users and bridged pre-existing users where all users are connected for unified communication at a predetermined scheduled time; and
    g) effecting steps a) through f) in the absence of any required activity by said users.

11. The method as set forth in claim 10, wherein said amalgamating includes connection of a non conferencing electronic communication platform to said conferencing platform for unified participation of said additional users and bridged pre-existing users.

12. A method of simplifying electronic communications between a plurality of users, each user having at least one electronic identifier, comprising:
    a) providing a first electronic conferencing and scheduling platform and a second electronic conferencing and scheduling platform, said second electronic conferencing and scheduling platform operating on a dissimilar protocol from said first electronic conferencing and scheduling platform;
    b) selecting a plurality of users for contact from a provided or determined identifier of each selected user using either said first electronic conferencing and scheduling platform or said second electronic conferencing and scheduling platform;
    c) establishing a first bridge of interconnected users isolated on said first electronic conferencing and scheduling platform;
    d) establishing a second bridge of interconnected users isolated on said second electronic conferencing and scheduling platform;
    e) forming a bridge link;
    f) creating bridged users using said bridge link by bridging users on said first electronic conferencing and scheduling platform with users on said second electronic conferencing and scheduling platform for intercommunication between the platforms; and
    g) effecting steps a) through f) in the absence of any required activity by said users.

13. The method as set forth in claim 12, wherein contact of said users is simultaneous.

14. The method as set forth in claim 12, further including allowing access to said bridge link from an independent user.

\* \* \* \* \*